(12) United States Patent
Xing et al.

(10) Patent No.: US 9,772,909 B1
(45) Date of Patent: Sep. 26, 2017

(54) DYNAMIC PROXY SERVER ASSIGNMENT FOR VIRTUAL MACHINE BACKUP

(75) Inventors: Jian Xing, Pleasanton, CA (US); Windsor W. Hsu, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 949 days.

(21) Appl. No.: 13/436,630

(22) Filed: Mar. 30, 2012

(51) Int. Cl.
*G06F 17/30* (2006.01)
*G06F 11/14* (2006.01)

(52) U.S. Cl.
CPC ...... *G06F 11/1469* (2013.01); *G06F 11/1451* (2013.01); *G06F 11/1458* (2013.01)

(58) Field of Classification Search
CPC ............... G06F 17/30; G06F 17/30575; G06F 11/1469; G06F 11/1458; G06F 11/1451; H04L 67/28
USPC ........................................................ 707/640
See application file for complete search history.

(56) References Cited

U.S. PATENT DOCUMENTS

| | | | |
|---|---|---|---|
| 6,230,200 B1 * | 5/2001 | Forecast et al. | 709/226 |
| 8,046,329 B2 * | 10/2011 | Shah et al. | 707/624 |
| 8,060,476 B1 | 11/2011 | Afonso et al. | |
| 8,438,349 B2 | 5/2013 | Olson et al. | |
| 2004/0210671 A1 | 10/2004 | Beadle et al. | |
| 2010/0070725 A1 | 3/2010 | Prahlad et al. | |
| 2010/0262794 A1 | 10/2010 | De Beer et al. | |
| 2010/0332818 A1 * | 12/2010 | Prahlad et al. | 713/150 |
| 2011/0047340 A1 * | 2/2011 | Olson et al. | 711/162 |
| 2011/0106755 A1 | 5/2011 | Hao et al. | |
| 2011/0138037 A1 | 6/2011 | Sharma et al. | |
| 2012/0089700 A1 | 4/2012 | Safruti et al. | |
| 2012/0110328 A1 * | 5/2012 | Pate et al. | 713/165 |
| 2012/0158662 A1 * | 6/2012 | Buragohain et al. | 707/649 |

OTHER PUBLICATIONS

Freedman, Alan; Computer Desktop Encyclopedia; Definitions of 'server'; <http://www.computerlanguage.com/>, accessed Dec. 18, 2015.*
Freedman, Alan; Computer Desktop Encyclopedia; Definitions of 'proxy server'; <http://www.computerlanguage.com/>, accessed Dec. 18, 2015.*
Non final Office Action, U.S. Appl. No. 13/436,636, dated Sep. 3, 2013, 13 pages.
Notice of Allowance, U.S. Appl. No. 13/436,636, dated Jun. 2, 2014, 8 pages.
Final Office Action, U.S. Appl. No. 13/436,636, dated Nov. 22, 2013. 13 pages.

* cited by examiner

*Primary Examiner* — Leslie Wong
(74) *Attorney, Agent, or Firm* — Blakely, Sokoloff, Taylor & Zafman LLP

(57) ABSTRACT

A computer-implemented proxy server local to a backup target system performs a backup method for a system supporting a plurality of virtual machines. The backup method includes receiving an initialization of a connection over a network from a backup server identifying the system to backup to the backup target system, establishing a communication connection over the network with the system to backup including identifying an interface for accessing data of the system to backup, receiving an image of the system to backup from the backup server, retrieving a data set corresponding to the image from the system to backup over the network, and writing the data set to a local file in the backup target system.

20 Claims, 5 Drawing Sheets

DYNAMIC PROXY SERVER ASSIGNMENT FOR VIRTUAL MACHINE BACKUP

CROSS-REFERENCE TO RELATED APPLICATION

This application is related to patent application entitled "Dynamic Proxy Server Assignment For Virtual Machine Backup," U.S. patent application Ser. No. 13/436,636, filed Mar. 30, 2012, now U.S. Pat. No. 8,782,008, issued Jul. 15, 2014 and commonly owned. The cross-referenced application is incorporated herein by reference.

FIELD OF THE INVENTION

The embodiments of the invention relate to a method and system for utilizing a proxy to assist in the transfer of backup data related to a set of virtual machines. Specifically, the embodiments relate to a method and system for utilizing a proxy at the backup target system or dynamically placing a proxy for improving efficiency in resource utilization.

BACKGROUND

Data backup is utilized to protect important information from being lost and to assist in restoring it to individual computer systems or sets of networked computers in response to failure or similar data losses. The computer systems to be backed up can be any type of computer system including those that execute a virtual machine or a set of virtual machines such as computers executing a virtual machine server. The presence of virtual machines in a system that is to be backed up presents additional challenges to ensure that the backup properly obtains the necessary files for restoring the virtual machine system. The backup process of such a virtual machine system thus requires that the files necessary for executing the virtual machine system and the operating systems (i.e., guest operating systems) and applications running within the virtual machine be backed up. Specifically, in these virtual machine systems, the requirements for restoring the virtual machine systems include the creation of a full virtual machine image backup as well as guest operating system level backups for operational file recovery and application consistency. A guest operating system is an operating system executing on top of a virtual machine, as distinguished from an operating system running on the physical hardware of a computer system. Backing up the virtual machine by creating a virtual machine image ensures that the virtual machine itself can be restored. Backing up the guest operating system and the applications running on the guest operating system enables the restoration of these services. However, this can result in a significant amount of redundant data being backed up, which it is the job of the backup process to reduce through deduplication.

This backup process often is executed while the virtual machine system is running. If the backup process is primarily run by a client application and executed by the virtual machine system, then the resources necessary for collecting the data, deduplicating the data and possibly encrypting or compressing the data are consumed from the available virtual machine system resources. This slows down the virtual machine system and hinders its ability to service clients via the applications running on the guest operating systems and thereby perform its intended function. To minimize the impact on the virtual machine system by the backup process, an external physical server, referred to herein as a physical proxy server, can be set up in communication with the virtual machine system to collect the data, process it and prepare it for storage, thereby freeing the resources of the virtual machine to perform its intended function.

This physical proxy server can also function in combination with the storage system storing the backup data, referred to as a backup target system (i.e., the system to be the recipient or 'target' of the backup data). This backup target system encompasses any number of storage devices or can be itself a set of separate data stores with any number of individual data storage devices in which the backup storage data can be maintained and, if necessary, retrieved. The physical proxy server manages the collection, processing and transference of the backup data from the virtual machine system to the backup target system. Examples of the virtual machine systems include the ESX system by VMware of Palo Alto, Calif. and the examples of the physical proxy servers and backup target systems include the Avamar and Data Domain systems by EMC of Hopkinton, Mass.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present invention.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In one embodiment, a backup target system is a deduplicated storage system having a set of storage units. A 'set,' as used herein refers to any positive whole number of items including one item. Each of the storage units is configured to store data chunks that are deduplicated within each of the data storage units, where the files stored in the backup storage system are comprised of the data chunks. Each data chunk is formed through a specific policy, e.g. by breaking a file based on properties of the content in the file, which permits changes to one data chunk without affecting the boundaries or contents of other chunks. Each data chunk is associated with a fingerprint and similar meta-data (e.g., meta-data) representing the data chunk. A fingerprint contains a meta-data value (e.g., a hash value) that uniquely identifies that data object. Fingerprints can be used to identify duplicate data chunks. As used herein, this meta-data is in contrast with the 'content' of the data in the files.

The system and process described herein for providing a proxy server at a backup target system or a dynamic placement of the proxy server based on current conditions enables improved resource utilization for the available resources. The availability of a proxy server at the backup target system saves the cost of purchasing and managing a separate physical proxy server, and reduces the backup traffic flowing through the network and IT infrastructure. The dynamic placement of the proxy server enables the improvement of resource utilization to diminish the impact of the backup process on those components with the highest load or most important function.

Figure 1A:
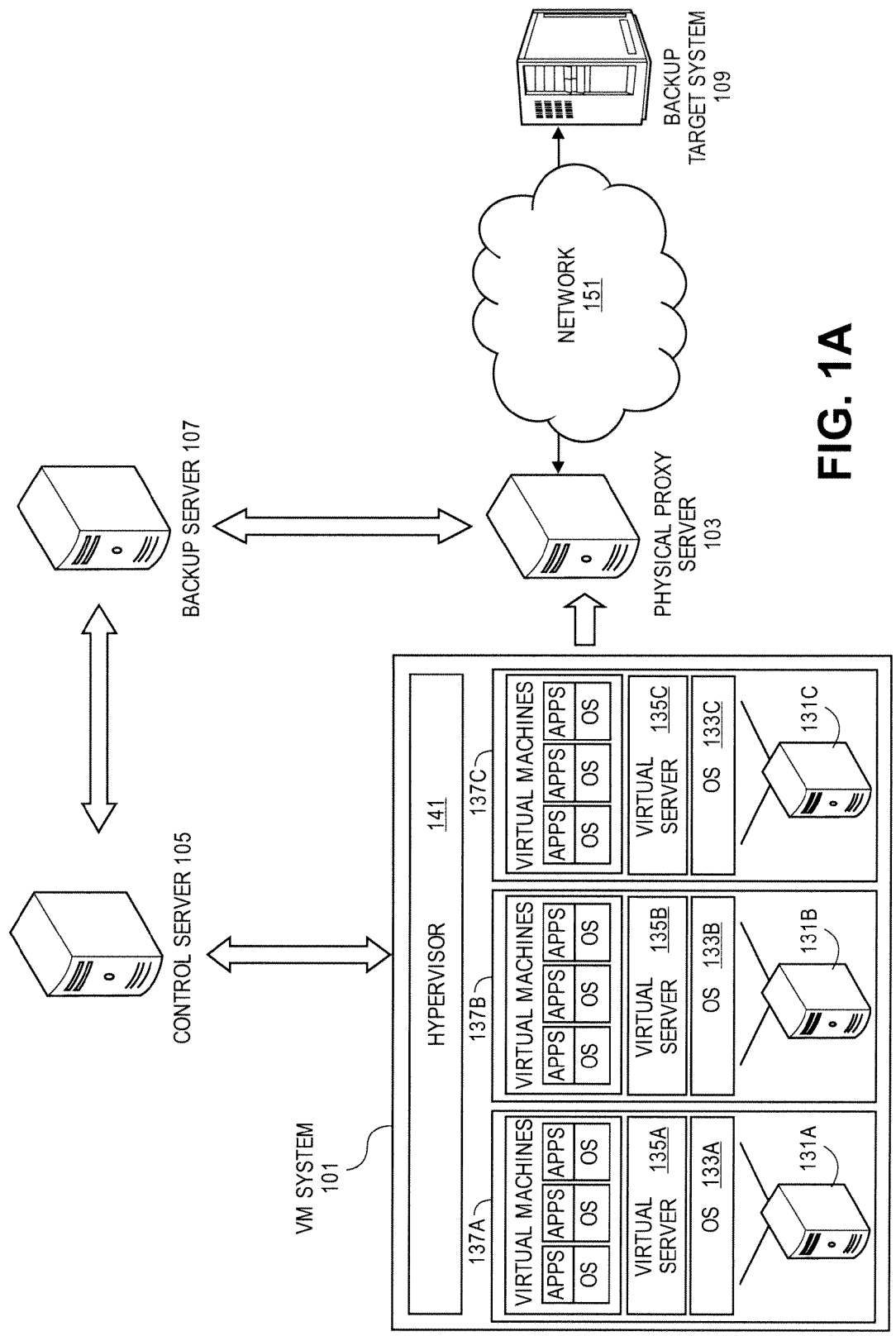
FIG. 1A is a diagram of one embodiment of a physical proxy server backup system.

FIG. 1A is a diagram of one embodiment of a system employing a separate physical proxy server to backup a virtual machine system. The system of FIG. 1A includes a control server 105, a backup server 107, a virtual machine system 101, a physical proxy server 103 and a backup target system 109. Each of these components of the overall system can be constituted from any number or type of computing devices including dedicated servers, workstations, desktops and similar computing devices. These devices are in communication over either direct links or indirect links over a network. Links in the network can include any type of communication medium including wired or wireless communication links. The networks can be configured to be any type of network including a local area network, a wide area network such as the Internet or similar network.

The backup server 107 can be a set of software that manages the backup process on behalf of the virtual machine system 101. The backup server 107 can also manage the backup of other systems. For the sake of convenience and clarity, the scenario has been simplified to illustrate the backup of a single virtual machine system 101. One skilled in the art would understand that any number of virtual machine systems 101 could be backed up according to the structures and principles described herein. Similarly, the backup server 107 can utilize any number of backup target systems 109 to store data of the set of virtual machine systems 101 or other system backed up by the backup server 107.

The backup server 107, physical proxy server 103, virtual machine system 101 and control server 105, in one embodiment, can be connected through a local area network or a set of local area networks under the control of a single entity. The backup target system 109 might be connected to these components through a connection over a wide area network, such as the Internet. One of ordinary skill in the art would understand that these components may be in communication with each other over any combination of local area or wide area networks and that the illustrated system is provided by way of example and not limitation.

The backup server 107 may communicate with the control server 105 and physical proxy server 103 to schedule and implement the backup process for the virtual machine system 101. The backup server 107 can initiate the backup process by requesting that the control server 105 create a snapshot or similar profile of the virtual machine system 101 for purposes of the backup. This profile or snapshot is a catalog of the files and data to be transferred from the virtual machine system to the backup target system 109. The backup server 107 directs the physical proxy server to establish a connection with the virtual machine system 101 and provides the profile or snapshot received from the control server 105 to the physical proxy server 103 to enable it to retrieve the identified data and transfer it to the backup target system 109. In one example embodiment, the control server 105 may be a vCenter Server by VMware. The snapshot may be a virtual machine disk format (VMDK) snapshot.

The virtual machine system 101 can include a hypervisor 141 as well as a set of physical machines 131A-131C that are managed by the hypervisor to provide a set of virtual machine servers 135A-135C. These virtual machine servers run on top of an operating system 133A-133C that operates on top of the physical hardware of the systems 131A-131C. This operating system may be a Windows operating system by Microsoft Corp, the Linux operating system, the OSX operating system by Apple, Inc or similar operating system. The virtual machine servers 135A-135C can be the VMware servers by VMware or similar virtual machine servers. The virtual machine servers provide a platform on which virtual machines can be instantiated 137A-137C. In turn, these virtual machines can execute the guest operating systems and applications on top of those guest operating systems. These guest operating systems and their applications can be transferred between physical machines and virtual machine servers to enable their continued availability to clients of these virtual machines. This transferring of control is managed by the hypervisor 141 in communication with the control server 105.

The physical proxy server 103 communicates with the virtual machine system 101 using an established protocol or interface such as virtual disk development kit (VDDK) by VMware. The physical proxy server 103 also communicates with the backup target system 109 to create a target file to hold the incoming data that it will transfer from the virtual machine system 101. The physical proxy server 103 reads the data from the virtual machine system 101 and sends it to the backup target system 109 to write to a file created by the backup target system 109 in accordance with the snapshot provided to the physical proxy server 103 by the backup server 107. During this collection and transfer process, the physical proxy server 103 or the backup target system 109 may do deduplication as well as compression and/or encryption. In one embodiment, the physical proxy server 103 cooperates with the backup target system 109 to deduplicate the data, transferring only data chunks that are not already in the backup target system 109. For example, the physical proxy server 103 may use the DD BOOST capability by EMC of Hopkinton, Mass. Upon completion of the transfer, the physical proxy server 103 closes the connections and files being accessed at the virtual machine system 101 via the established communication protocol or interface. The physical proxy server 103 also instructs the backup target system 109 to close the file created there and then closes that connection to the backup target system 109. The physical proxy server 103 then notifies the backup server 107 of its completion of the backup process.

Figure 1B:
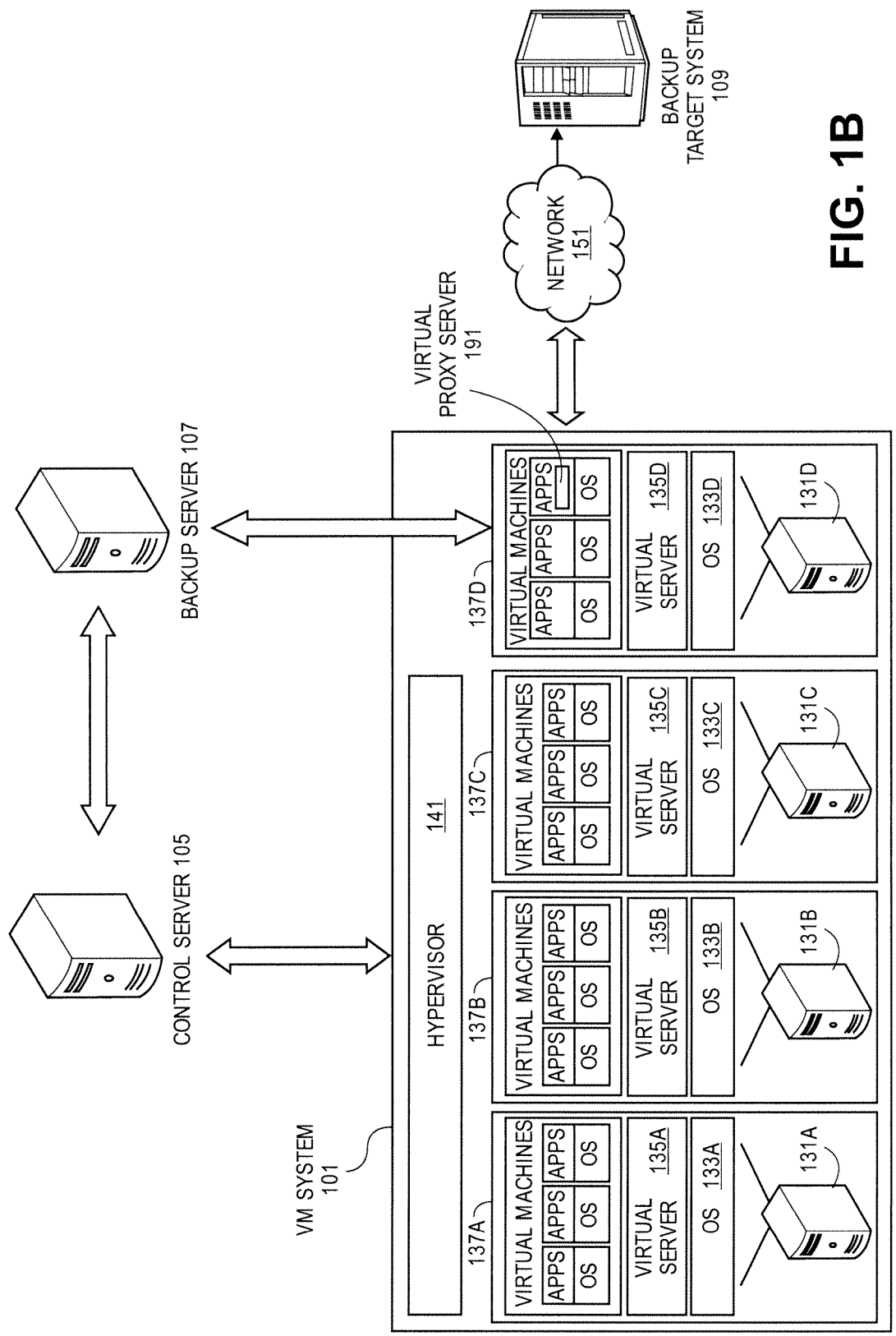
FIG. 1B is a diagram of one embodiment of a virtual proxy server backup system.

FIG. 1B is a diagram of one embodiment of a virtual proxy server backup system. The virtual proxy server backup system operates in a similar fashion to the backup process. In this virtual proxy server backup system there is no physical proxy server to perform the backup process. Instead a virtual proxy server 191 is executed by a virtual machine server 137D. The virtual proxy server 191 can be executed as a process of a guest OS of a virtual machine of the virtual machine server 137D. Multiple virtual proxy server 191 could be executed by different virtual machines within the virtual machine system 101.

The backup server 107 communicates with the virtual proxy server 191 and the control server 105 to provide the snapshot to the virtual proxy server 191. The backup server 107 creates a connection to the virtual machine system where the virtual proxy server 191 is housed rather than to a separate physical proxy server. The virtual proxy server 191 creates a connection to the backup target system 109 and is able to use a local interface for obtaining the data from the virtual machine on which it executes.

The other components of the virtual proxy server backup system operate as described above in regard to the physical proxy server system. The virtual proxy server backup system requires greater resources from the virtual machine system 101 than the separate physical proxy server system, but reduces the complexity of the physical proxy server system, which requires the separately administered physical proxy server and the network connections between it and the other components of the system.

Figure 2:
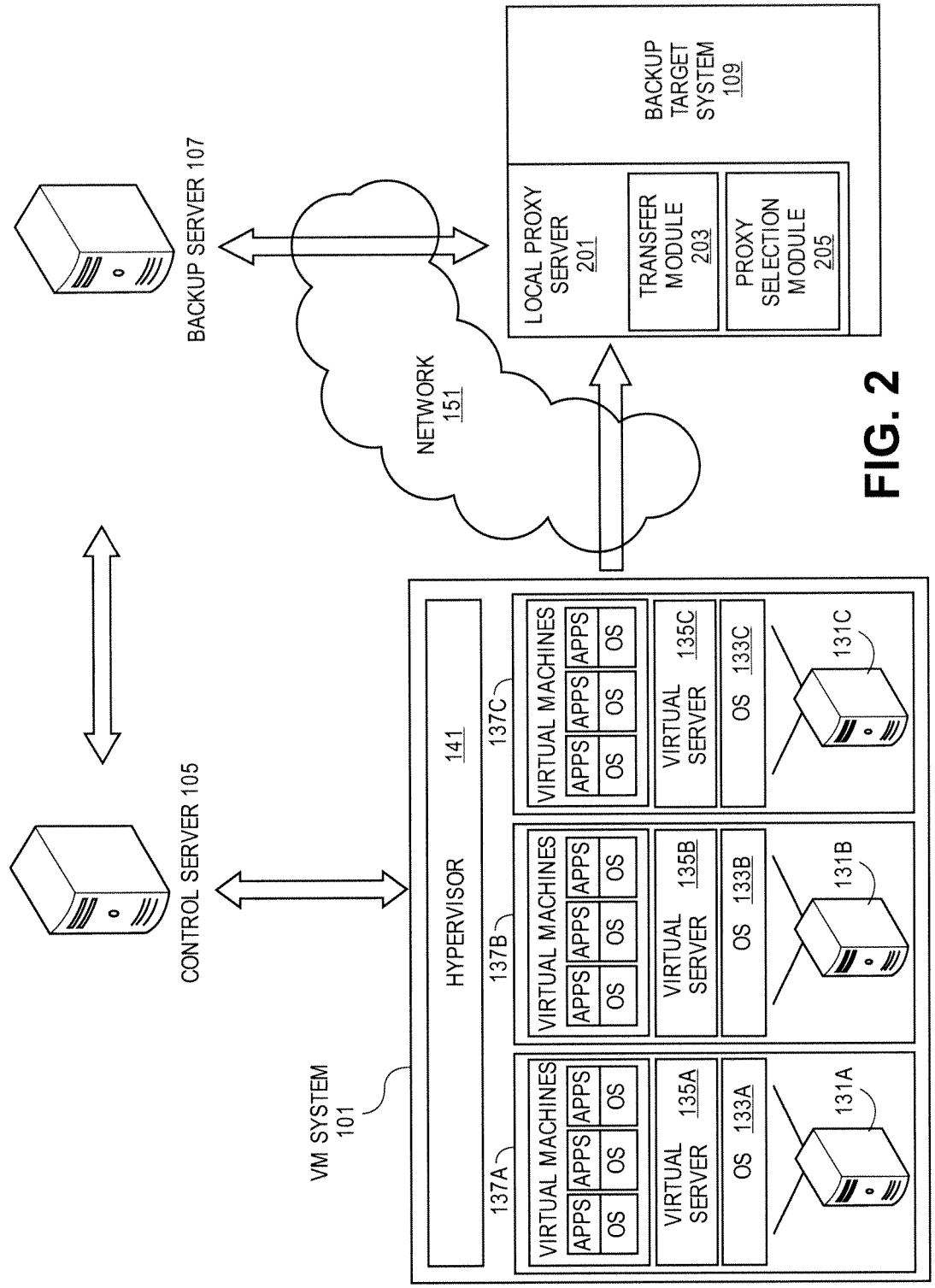
FIG. 2 is a diagram of one embodiment of a backup system with a proxy server provided by a backup target system.

FIG. 2 is a diagram of one embodiment of a system for backing up the virtual machine system using a local proxy server 201 and backup target system 109. In this embodiment, the local proxy server 201 is hosted and executed by the machine providing and managing the backup target system 109. The backup target system 109 and local proxy server 201 are, in one embodiment, located remotely from the other system components such as the backup server 107 and virtual machine system 101. The virtual machine system 101 and backup server 107 can communicate with both of the local proxy server 201 and the backup target system 109 over a wide area network 151 such as the Internet. This reduces the amount of data traffic within the network of the virtual machine system 101, control server 105 and backup server 107.

In this embodiment, the backup server 107 requests that the control server 105 generates the snapshot of the virtual machine system 101, then provides the snapshot received from the control server 105 to the local proxy server 201 at the backup target system 109 over the network 151 and the local proxy server 201 opens a connection to the virtual machine system 101 over the network 151. The local proxy server 201 then initiates the transfer of the data identified by the snapshot through this connection. This connection utilizes primarily the external network 151 connection between the virtual machine system 101 and the backup target system 109. The connection can use any type of protocol or interface including the VDDK.

The data received by the local proxy server 201 is processed and prepared to be stored in a file of the backup target system 109, which can be stored in the backup target system using a local write operation rather than another network transfer operation. This reduces the amount of network transmission of data required for a backup process and the associated resources. The local proxy server 201 can write the data to the backup target system 109 more efficiently in comparison with a physical proxy server, because the local write can be executed at a higher bandwidth and with quicker response times and more reliably than over a network connection as is required for the physical proxy server.

Figure 3:
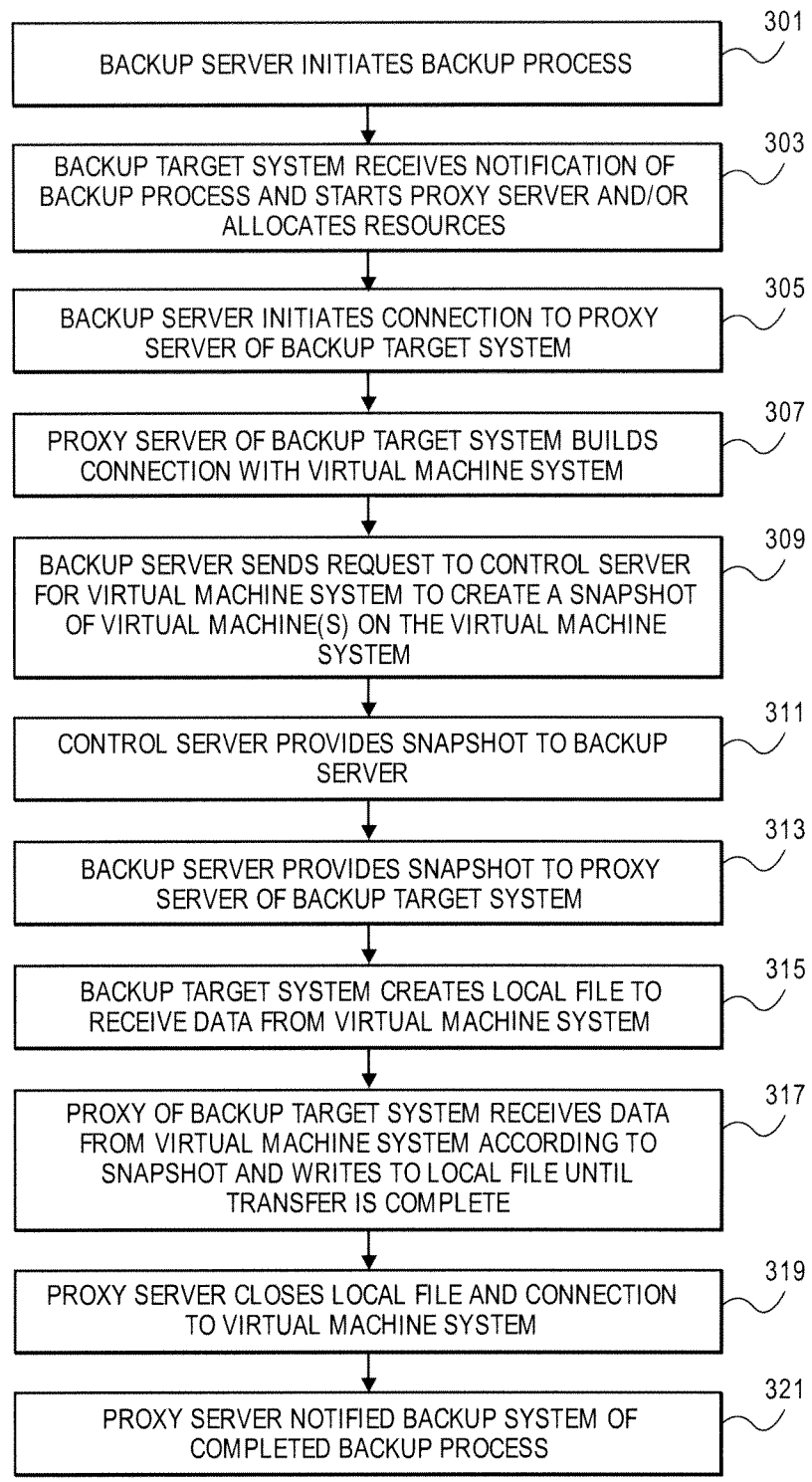
FIG. 3 is a flowchart of one embodiment of a process for initiating a backup from the proxy server provided by the backup target system.

FIG. 3 is a diagram of one embodiment of the backup process. This process can be initiated by the backup server at a scheduled time, as configured by an administrator (Block 301). Backups can be scheduled at any interval or with any frequency. The backup process can also designate specific machines to be backed up, files to be transferred or subsets of available data to be transferred. This is managed by the backup server by directing the activities of the proxy server and the control server.

The backup server notifies the backup target system that a backup process is being initiated. In one embodiment, the notification includes an estimated amount of backup data and performance requirements for transferring the backup data. The backup target system determines the amount of resources (e.g. memory, CPU, etc) needed by the local proxy to perform the backup and the amount of resources available, taking into account other workloads on the system. If it is determined that there are enough resources to perform the backup, the backup target system starts the local proxy server if it is not already started and/or allocates the needed resources to the local proxy server (Block 303). If it is determined that there are not enough resources to perform the backup, the backup target system informs the backup server which then retries at a later time or fails the backup.

The backup server initiates a connection to the local proxy server of the backup target system (Block 305). This connection may be any type of network communication protocol including secure communication protocols. This initial connection can be utilized to notify the proxy server that a backup process is being initiated by the backup server and may provide the identification information for the virtual machine system (or set of virtual machine systems) to be backed up such that the proxy server can then in turn initiate a connection with the virtual machine system (Block 307). The connection between the proxy server and the backup target system is a local or wide area network connection and can use any protocol including secure protocols. The local proxy server can interface with the virtual machine system using any type of network connection or interface including the VDDK by VMware or a similar interface.

The backup server 107 also sends a request to the control server 105 to obtain a snapshot of the virtual machine system. The snapshot can include information about the organization of data in the virtual machines, identifying files and data to be obtained from the virtual machines by the local proxy server (Block 309). This request can be done in parallel with or even preceding the establishment of a connection between the backup server and the local proxy server. The control server in response generates a snapshot in coordination with the hypervisor of the virtual machine system. The control server provides this snapshot back to the backup server 107. This snapshot can be a VMDK snapshot (Block 311). The backup server then in turn provides a snapshot to the local proxy server of the backup target system (Block 313). The snapshot can be used as a guide by the local proxy server of the backup target system to initiate the retrieval and transfer of data from the virtual machine system. The backup target system is directed by the local proxy server to create a local file to receive the data from the virtual machine system (Block 315). The local proxy server of the backup target system then utilizes the open connection to the virtual machine system 101 and the interface to begin to retrieve data from the virtual machine system in accordance with the snapshot, and then to write this data to the local file within the backup target system 109 until the transfer is complete (Block 317). The proxy server then closes the local file and the connection to the virtual machine system upon completion of the transfer (Block 319). The local proxy server then notifies the backup server that the backup process transfer has been completed (Block 321).

Figure 4:
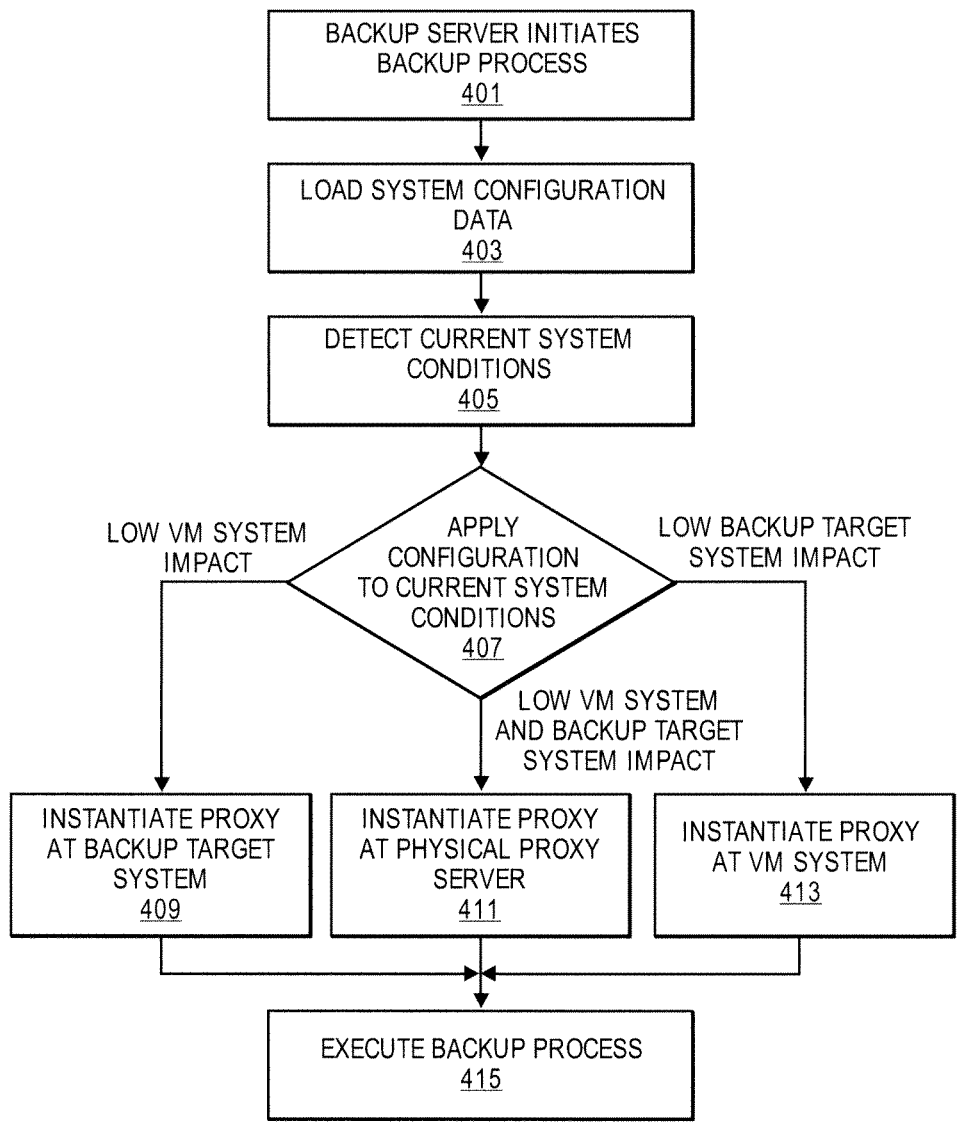
FIG. 4 is a diagram of one embodiment of a process for dynamically establishing a proxy server.

FIG. 4 is a diagram of one embodiment of a process for dynamically selecting the proxy server location. The placement and execution of the proxy server can affect the functioning of both the virtual machine system and the backup target system. The placement and execution of the proxy server can also affect the overall load imposed on the IT infrastructure (including network) by the backup process. Thus, depending on availability of resources in each of these systems as well as the added complexity of maintaining a separate physical proxy server, it can be desirable to alter or dynamically select the location of the proxy server to minimize the impact on each of the components. This dynamic process is initiated by the backup server, which maintains the schedule and timing of the backup processes as configured or directed by an administrator.

At the time of a scheduled backup, the backup server initiates the backup process (Block 401). The backup server loads the system configuration data (Block 403). The system configuration data provides information about the configuration of the available resources including the availability of a physical proxy server, the capacity and identification of the virtual machine system and control server, as well as the identification, availability and resources of the backup target system. The backup server can also detect or request from the other components in the system current system conditions (Block 405). This can include current loads, network bandwidth, schedules and similar information that will assist the backup server and determine the ideal location for the instantiation of a proxy server to handle the backup process.

The system configuration and the current system conditions are combined by the backup server to determine the current load and capabilities of each of the virtual machine system, the backup target system, as well as any possible physical proxy server location (Block 407). If the virtual machine system has a high load or has limited capabilities, then the backup server can determine that a low virtual machine impact is desired. A low impact on a system, as used herein refers to minimizing the resources required by the system, such as offloading data retrieval to a remote proxy server with only a thin client or similar local software executing in support of the backup process.

If there is not a physical proxy server available, then the low virtual machine system impact dictates that the proxy be instantiated at the backup target system (Block 409). In this embodiment, the backup target system is notified of the decision of the backup server and the backup target system instantiates a local proxy to carry out the backup process (Block 415). The backup process proceeds as described above herein as described in relation to the process illustrated in FIG. 3, with the backup server then starting the communication with the newly instantiated proxy server and the control server to obtain the snapshot and the start of the transfer.

If it is determined by the backup server that the backup target system has a heavy load and it is desirable to maintain a low backup system impact, then the proxy may be established as a virtual proxy within the virtual machine system (Block 413) when there is not a physical proxy server available. The virtual proxy within the virtual machine system consumes virtual machine system resources but limits the amount of resources required by the backup target system. In one embodiment, the proxy server performs deduplication and/or compression and if it is determined that the network between the virtual machine system and the backup target system has a heavy load, then the proxy may be established as a virtual proxy within the virtual machine system. In one embodiment, the proxy server cooperates with the backup target system to deduplicate the data, transferring only data chunks that are not already in the backup target system. For example, the proxy server may use the DD BOOST capability by EMC of Hopkinton, Mass.

If both the virtual machine system and the backup target system have high loads or limited resources and the physical proxy server is available, then the proxy can be instantiated at the physical proxy server (Block 411). This process then continues to execute the backup process as described above in regard to FIG. 3 (Block 415). If both the backup target system and the virtual machine system are heavily loaded and both have limited resources, then the backup server configuration can define a preference for which of the servers is to be encumbered with the proxy when the physical proxy server is not available. In further embodiments, multiple proxy servers can be instantiated and operate in coordination to share the load based on the system resources and load of each of the systems.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer-readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer-readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method of a proxy server local with a backup target system for performing a backup of a source system supporting a plurality of virtual machines, the method comprising:
    receiving, by a processor of the backup target system, an initialization of a connection over a network from a backup server identifying the source system to be backed up to the backup target system, wherein the backup server is configured to manage backup operations of a plurality of storage systems over the network, including the source system and the backup target system, wherein the backup server communicated with a control server over the network to request snapshot of the source system, wherein the control server is configured to manage a plurality of virtual machines hosted by a plurality of virtual machine systems including the source system, wherein the control server requests the source system to create a snapshot, to receive the snapshot from the source system, and to transmit the snapshot to the backup server;
    in response to the initialization of the connection, launching a proxy server by the processor within the backup target system;
    receiving, by the proxy server, metadata of the snapshot of the source system from the backup server, wherein the metadata includes information identifying a virtual machine of the source system, organization of data in the virtual machine, and files of the virtual machine to be backed up;
    establishing by the proxy server a communication connection over the network with the virtual machine of the source system based on the metadata received from the backup server;
    retrieving, by a transfer module hosted by the proxy server, a data set corresponding to the snapshot from the source system via the communication connection over the network; and
    writing, by the transfer module of the proxy server via local write operations, the data set to a local file in the backup target system.

2. The computer-implemented method of claim 1, further comprising:
    opening the local file on the backup target system to receive the data set.

3. The computer-implemented method of claim 1, further comprising:
    notifying the backup server of a completion of a transfer of the data set to the backup target system.

4. The computer-implemented method of claim 1, wherein the snapshot of the source system is generated by a control server for the source system.

5. The computer-implemented method of claim 1, wherein the data set includes virtual machine data.

6. The computer-implemented method of claim 5, wherein the data set includes guest operating system data and application data from the guest operating system.

7. The computer-implemented method of claim 1, wherein the proxy server deduplicates the data set.

8. The computer-implemented method of claim 1, wherein the proxy server encrypts or compresses the data set.

9. The computer-implemented method of claim 1, further comprising:
    receiving an indicator of an amount of resources needed by the proxy server;
    starting the proxy server when there are available resources to meet the amount of resources needed by the proxy server; and
    allocating the amount of resources needed by the proxy server to the proxy server.

10. A non-transitory computer-readable storage medium having instructions stored therein, which when executed by a computer, cause the computer to perform a set of operations that back up data from a source system supporting a plurality of virtual machines to a backup target system, the operations comprising:
    receiving, by a processor of the backup target system, an initialization of a connection over a network from a backup server identifying the source system to be backed up to the backup target system, wherein the backup server is configured to manage backup operations of a plurality of storage systems over the network, including the source system and the backup target system, wherein the backup server communicated with a control server over the network to request snapshot of the source system, wherein the control server is configured to manage a plurality of virtual machines hosted by a plurality of virtual machine systems including the source system, wherein the control server requests the source system to create a snapshot, to receive the snapshot from the source system, and to transmit the snapshot to the backup server;
    in response to the initialization of the connection, launching a proxy server by the processor within the backup target system;
    receiving by the proxy server metadata of the snapshot of the source system from the backup server, wherein the metadata includes information identifying a virtual machine of the source system, organization of data in the virtual machine, and files of the virtual machine to be backed up;
    establishing by the proxy server a communication connection over the network with the virtual machine of the source system based on the metadata received from the backup server;
    retrieving, by a transfer module hosted by the proxy server, a data set corresponding to the snapshot from the source system via the communication connection over the network; and
    writing, by the transfer module of the proxy server via local write operations, the data set to a local file in the backup target system.

11. The computer-readable storage medium of claim 10, having further instructions stored therein, which if executed cause the computer to perform operations further comprising:
    opening the local file on the backup target system to receive the data set.

12. The computer-readable storage medium of claim 10, having further instructions stored therein, which if executed cause the computer to perform operations further comprising:

notifying the backup server of a completion of a transfer of the data set to the backup target system.

13. The computer-readable storage medium of claim 10, wherein the snapshot of the source system is generated by a control server for the source system.

14. The computer-readable storage medium of claim 10, wherein the data set includes virtual machine data.

15. The computer-readable storage medium of claim 14, wherein the data set includes guest operating system data and application data from the guest operating system.

16. The computer-readable storage medium of claim 10, wherein the proxy server deduplicates the data set.

17. The computer-readable storage medium of claim 10, wherein the proxy server encrypts or compresses the data set.

18. The computer-readable storage medium of claim 10, wherein the operations further comprise:
   receiving an indicator of an amount of resources needed by the proxy server;
   starting the proxy server when there are available resources to meet the amount of resources needed by the proxy server; and
   allocating the amount of resources needed by the proxy server to the proxy server.

19. A system operating as a backup target system, comprising:
   a set of storage devices to store a backup data file;
   a processor coupled to the set of storage devices; and
   a memory coupled to the processor storing instructions, which when executed by the processor, cause the processor to perform backup operations from a source system to the backup target system, the operations including
      receiving an initialization of a connection over a network from a backup server identifying the source system to be backed up to the backup target system, wherein the backup server is configured to manage backup operations of a plurality of storage systems over the network, including the source system and the backup target system, wherein the backup server communicated with a control server over the network to request snapshot of the source system, wherein the control server is configured to manage a plurality of virtual machines hosted by a plurality of virtual machine systems including the source system, wherein the control server requests the source system to create a snapshot, to receive the snapshot from the source system, and to transmit the snapshot to the backup server,
      in response to the initialization of the connection, launching a proxy server by the processor within the backup target system,
      receiving by the proxy server metadata of the snapshot of the source system from the backup server, wherein the metadata includes information identifying a virtual machine of the source system, organization of data in the virtual machine, and files of the virtual machine to be backed up,
      establishing by the proxy server a communication connection over the network with the virtual machine of the source system based on the metadata received from the backup server,
      retrieving, by a transfer module hosted by the proxy server, a data set corresponding to the snapshot from the source system via the communication connection over the network, and
      writing, by the transfer module of the proxy server via local write operations, the data set to a local file in the backup target system.

20. The system of claim 19, wherein the operations further comprise:
   opening the local file on the backup target system to receive the data set.

* * * * *